United States Patent [19]
Dietrich et al.

[11] Patent Number: 4,668,734
[45] Date of Patent: May 26, 1987

[54] STABLE DISPERSIONS OF POLYUREAS AND/OR POLYHYDRAZO-DICARBONAMIDES IN RELATIVELY HIGH MOLECULAR WEIGHT HYDROXYL-GROUP CONTAINING MATERIALS, A PROCESS FOR THE PRODUCTION THEREOF AND THE USE THEREOF FOR THE PRODUCTION OF POLYURETHANE PLASTICS

[75] Inventors: Manfred Dietrich; Klaus König, both of Leverkusen; Hans Hettel, Cologne; Peter Seifert, Bad Wildungen; Peter Vehlewald, Leichlingen, all of Fed. Rep. of Germany

[73] Assignee: Bayer Aktiengesellschaft, Leverkusen, Fed. Rep. of Germany

[21] Appl. No.: 811,862

[22] Filed: Dec. 20, 1985

[30] Foreign Application Priority Data

Jan. 8, 1985 [DE] Fed. Rep. of Germany ....... 3500339

[51] Int. Cl.$^4$ .............................................. C08L 75/02
[52] U.S. Cl. .................... 524/714; 252/182; 524/722; 524/742; 524/757; 524/759; 524/760; 524/761; 524/762; 524/765; 524/766; 524/767; 524/769; 528/44; 528/68; 528/69
[58] Field of Search ............... 524/714, 722, 742, 757, 524/759, 760, 761, 762, 765, 766, 767, 769; 252/182; 528/44, 68, 69

[56] References Cited

U.S. PATENT DOCUMENTS

| 3,325,421 | 6/1967 | Muller ............................... 252/308 |
| 4,089,835 | 5/1978 | Konig et al. ...................... 260/31.6 |
| 4,093,569 | 6/1978 | Reischl et al. .................... 260/2.5 |
| 4,147,680 | 4/1979 | Reischl et al. .................... 260/29.2 |

Primary Examiner—Maurice J. Welsh
Attorney, Agent, or Firm—Gene Harsh; Joseph C. Gil; Lyndanne M. Whalen

[57] ABSTRACT

The present invention is directed to a stable dispersion of a polyurea and/or a polyhydrazodicarbonamide in a relatively high molecular weight hydroxyl-group containing material, which dispersion has a solids content of from 5 to 50 percent by weight and which is obtained by reacting (a) an organic di- and/or polyisocyanate with
(b) an amine-functional material comprising an addition product of
　(1) acrylonitrile and
　(2) a member selected from the group consisting of
　　(i) hydrazine,
　　(ii) aliphatic di- or polyamines containing at least two primary amino groups,
　　(iii) cycloaliphatic di- or polyamines containing at least two primary amino groups,
　　(iv) araliphatic di- or polyamines containing at least two primary amino groups, and
　　(v) mixtures thereof, the ratio of (1) to (2) being at least one mol of (1) per mol of (2) and at most one mol of (1) for each nitrogen atom contained in (2) per mol of (2), the reaction of component (a) and component (b) being conducted at a temperature of from 30° to 170° C., at an equivalent ratio of components (a) to (b) of from 0.8:1 to 1.5:1, and in the presence of (c) a relatively high molecular weight, hydroxyl-group containing material.

The invention also relates to the production and use of such dispersions.

12 Claims, No Drawings

STABLE DISPERSIONS OF POLYUREAS AND/OR POLYHYDRAZO-DICARBONAMIDES IN RELATIVELY HIGH MOLECULAR WEIGHT HYDROXYL-GROUP CONTAINING MATERIALS, A PROCESS FOR THE PRODUCTION THEREOF AND THE USE THEREOF FOR THE PRODUCTION OF POLYURETHANE PLASTICS

BACKGROUND OF THE INVENTION

Stable dispersions of polyureas and polyhydrazodicarbonamides in polyols ("PHD-polyols") have achieved great commercial importance as starting materials for the production of polyurethane materials including flexible foams, integral skin foams for bumpers, shoe soles, moped saddles, adhesives, coatings, joint casting compounds and the like. Foam seats from PHD-polyols are produced for the automobile industry, particularly in the United States.

Various processes have become known over the last 20 years for the production of such dispersions by reacting organic isocyanates with primary and/or secondary amino group-containing polyamines and/or hydrazines and/or hydrazides in relatively high molecular weight polyols.

Such dispersions can, for example, be produced according to German Auslegeschrift No. 1,260,142 (U.S. Pat. No. 3,325,421), by dissolving the amine component in the polyether. The diisocyanate is then added dropwise at room temperature. Even small quantities of the polyaddition product (2–5%) produce a substantial rise in viscosity. Polyethers having substantial amounts of primary hydroxyl groups (which are of particular importance for modern applications) are not mentioned.

Low-viscous, stable dispersions of polyureas and/or polyhydrazodicarbonamides are produced in situ according to German Pat. Nos. 2,513,815, 2,550,833 and 2,550,862 (U.S. Pat. No. 4,089,835) by continuously reacting organic polyisocyanates with primary and/or secondary amino group-containing polyamines and/or hydrazines and/or hydrazides in relatively high molecular weight polyols in a continuous flow mixer and by subsequently collecting the product leaving the pipeline mixer in a receiver. Water, which is optionally present, may be simultaneously or subsequently removed under vacuum. Polyurea dispersions can also be produced discontinuously by further processes described in German Offenlegungsschrift No. 2,550,796 (U.S. Pat. No. 4,093,569) or German Offenlegungsschrift No. 2,550,797 (U.S. Pat. No. 4,147,680). Low viscosities are achieved by the proportionate use of water as a reaction medium.

Only those products which are produced according to the teaching of German Pat. No. 2,513,815 (U.S. Pat. No. 4,089,835) have generally achieved commercial success.

In comparison with the pure polyethers (and other polyols), the polyurea dispersions produce polyurethane plastics with many advantages. Thus, for example, foaming-reliability is improved in the case of flexible foam blocks and in cold mold foaming. Furthermore, a more advantageous hardness/apparent density relation for the foams is achieved. In the case of integral skin foams, the modulus and rigidity are improved. The adhesion is improved in the case of adhesives. Even stricter demands are made on foams with respect to very good hardness (e.g., load bearing properties). Consequently it was necessary to further develop dispersions containing high quantities of filler and simultaneously low viscosities. The products of prior art do not meet or inadequately meet these demands, particularly if polyphenyl-polymethylene-polyisocyanates ("crude MDI") are used as the isocyanate component to produce the dispersions.

DESCRIPTION OF THE INVENTION

It has now surprisingly been found that dispersions containing large quantities of filler and having low viscosities are obtained - particularly when polyphenyl-polymethylene-polyisocyanates ("crude MDI") are used as starting material, and which dispersions produce the desired and required improvements in the properties of the polyurethane plastics produced therefrom, if addition products of (i) acrylonitrile and (ii) hydrazine and/or aliphatic di- and/or polyamines are used as the amine component in the production thereof. Thus, the present invention relates to stable dispersions of polyureas and/or polyhydrazodicarbonamides in relatively high molecular weight hydroxylgroup containing materials (preferably polyethers) which dispersions have a solids content of from 5 to 50% by weight and which are obtained by reacting (a) an organic di- and/or polyisocyanate with
(b) an amine-functional material comprising an addition product of
  (1) acrylonitrile and
  (2) a member selected from the group consisting of
    (i) hydrazine,
    (ii) aliphatic di- or polyamines containing at least two primary amino groups,
    (iii) cycloaliphatic di- or polyamines containing at least two primary amino groups,
    (iv) araliphatic di- or polyamines containing at least two primary amino groups, and
    (v) mixtures thereof,
  the ratio of (1) to (2) being at least one mol of (1) per mol of (2) and at most one mol of (1) for each nitrogen atom contained in (2) per mol of (2),
the reaction of component (a) and (b) being conducted at a temperature of from 30° to 170° C., at an equivalent ratio of components (a) to (b) of from 0.8:1 to 1.5:1, and in the presence of
(c) a relatively high molecular weight, hydroxy-group containing material.

Component (a) can contain up to 40 mol % of monoisocyanates. Additionally, component (b) can contain primary and/or secondary amino group-containing di- or polyamines and/or hydrazines and/or hydrazides (which can contain up to 40 mol % monoamines or alkanolamines) in an amount of up to 50% by weight. Finally, the reaction of components (a) and (b) can be conducted in the presence of (d) water, relatively low molecular weight hydroxyl compounds, catalysts, flameproofing agents and/or further auxiliaries.

The preferred dispersions are those wherein component (c) consists of a polyether in which at least 95% of the OH-groups are secondary. The solids contents of these preferred dispersions are from 5 to 30% by weight when the component (a) to (b) equivalent ratio is from 0.8:1 to 1.5:1, and are from 30 to 50% by weight when the component (a) to (b) equivalent ratio is from 0.8:1 to 1.3:1.

Also preferred are those dispersions wherein component (c) consists of a polyether in which at least 20% of the OH groups are primary. The solids contents of those preferred dispersions are from 5 to 15% by weight when the equivalent ratio of components (a) to (b) is from 0.8:1 to 1.3:1 and are from 15 to 40% by weight when the equivalent ratio is from 0.8:1 to 1.1:1.

This invention also relates to a process for the production of stable dispersions of polyureas and/or polyhydrazodicarbonamides in relatively high molecular weight hydroxyl group-containing compounds (preferably polyethers) having solids contents of from 5 to 50% by weight comprising reacting (a) an organic di- and/or polyisocyanate with
(b) an amine-functional material comprising an addition product of
  (1) acrylonitrile and
  (2) a member selected from the group consisting of
    (i) hydrazine,
    (ii) aliphatic di- or polyamines containing at least two primary amino groups,
    (iii) cycloaliphatic di- or polyamines containing at least two primary amino groups,
    (iv) araliphatic di- or polyamines containing at least two primary amino groups, and
    (v) mixtures thereof,
  the ratio of (1) to (2) being at least one mol of (1) per mol of (2) and at most one mol of (1) for each nitrogen atom contained in (2) per mol of (2),
the reaction of component (a) and (b) being conducted at a temperature of from 30° to 170° C., at an equivalent ratio of components (a) to (b) of from 0.8:1 to 1.5:1, and in the presence of
(c) a relatively high molecular weight, hydroxy-group containing material.

Component (a) can contain up to 40 mol % of monoisocyanates. Additionally, component (b) can contain primary and/or secondary amino group-containing di- or polyamines and/or hydrazines and/or hydrazides (which can contain up to 40 mol % monoamines or alkanolamines) in an amount of up to 50% by weight. Finally, the reaction of components (a) and (b) can be conducted in the presence of (d) water, relatively low molecular weight hydroxyl compounds, catalysts, flameproofing agents and/or further auxiliaries.

In one preferred process, component (a) is continuously reacted with (b) in component (c), optionally in the presence of component (d).

The invention also relates to a process for the production of polyurethane plastics, which may be foamed, and particularly of flexible foams, by reacting polyisocyanates with relatively high molecular weight hydroxyl compounds, optionally in the presence of water and/or readily volatile organic materials as blowing agents and optionally with the simultaneous use of catalysts, foaming auxiliaries and additives and chain-lengthening agents and/or cross-linking agents, characterized in that dispersions according to the invention are used as at least a portion of the relatively high molecular weight hydroxyl compounds.

The isocyanates used to prepare the dispersions herein include aliphatic, cycloaliphatic, araliphatic aromatic and heterocyclic di- and/or polyisocyanates, as described, for example, by W. Siefken in Justus Liebigs Annalen der Chemie, 562, pages 75 to 136. Examples include those corresponding to the formula $$Q(NCO)_n$$

wherein
n=2–4, preferably 2, and

Q represents an aliphatic hydrocarbon radical having from 2 to 18 (preferably from 6 to 10) carbon atoms, a cycloaliphatic hydrocarbon radical having from 4 to 15 (preferably from 5 to 13) carbon atoms, an aromatic hydrocarbon radical having from 6 to 15 (preferably from 6 to 13) carbon atoms, or an araliphatic hydrocarbon radical having from 8 to 15 (preferably from 8 to 13) carbon atoms. Specific examples include 1,4-tetramethylene diisocyanate; 1,6-hexamethylene diisocyanate; 1,12-dodecane diisocyanate; cyclobutane-1,3-diisocyanate; cyclohexane-1,3- and -1,4-diisocyanate and mixtures of these isomers; 1-isocyanato-3,3,5-trimethyl-5-isocyanatomethyl-cyclohexane (German Pat. No. 1,202,785 and U.S. Pat. No. 3,401,190); 2,4- and 2,6-hexahydrotoluylene diisocyanate and mixtures of these isomers; hexahydro-1,3- and/or -1,4-phenylene diisocyanate, perhydro-2,4'- and/or -4,4'-diphenylmethane diisocyanate, 1,3- and 1,4-phenylene diisocyanate, 2,4- and 2,6-toluylene diisocyanate and mixtures of any of these isomers; diphenylmethane-2,4'- and/or -4,4'-diisocyanate; naphthylene-1,5-diisocyanate, and the like.

Also useful are triphenylmethane-4,4',4''-triisocyanate; polyphenyl-polymethylene-polyisocyanates, as obtained by aniline-formaldehyde condensation and subsequent phosgenation and described, for example, in British Pat. Nos. 874,430 and 848,671; m- and p-isocyanatophenylsulphonyl isocyanates as described in U.S. Pat. No. 3,454,606; perchlorinated aryl polyisocyanates, as described for example in German Pat. No. 1,157,601 (U.S. Pat. No. 3,277,138); carbodiimide group-containing polyisocyanates as described in German Pat. No. 1,092,007 (U.S. Pat. No. 3,152,162) and in German Offenlegungsschriften Nos. 2,504,400, 2,537,685 and 2,552,350; norbornane diisocyanates as described in U.S. Pat. No. 3,492,330; allophanate group-containing polyisocyanates, as described, for example, in British Pat. No. 994,890, Belgian Pat. No. 791,626 and Dutch Patent Application No. 7,102,524; isocyanurate group-containing polyisocyanates, as described, for example, in U.S. Pat. No. 3,001,973, in German Pat. Nos. 1,022,789, 1,222,067 and 1,027,394 and in German Offenlegungsschriften Nos. 1,929,034 and 2,004,048; urethane group-containing polyisocyanates, as described, for example, in Belgian Pat. No. 752,661 or in U.S Pat. Nos. 3,394,164 and 3,644,457; acylated urea group-containing polyisocyanates as described in German Pat. No. 1,230,778; biuret group-containing polyisocyanates, as described, for example, in U.S. Pat. Nos. 3,124,605, 3,201,372 and 3,124,605 and in British Pat. No. 889,050; polyisocyanates produced by telomerization reactions, as described, for example, in British Pat. Nos. 965,474 and 1,072,956, in U.S. Pat. No. 3,567,763 and in German Pat. No. 1,231,688; reaction products of the aforementioned isocyanates with acetals as described in German Pat. No. 1,072,385; and polymeric fatty acid ester-containing polyisocyanates as described in U.S. Pat. No. 3,455,883. It is also possible to use the isocyanate group-containing distillation residues produced in commercial isocyanate production, optionally dissolved in one or more of the aforementioned polyisocyanates. It is also possible to use any mixtures of the aforementioned polyisocyanates.

The commercially available polyisocyanates, such as 2,4- and 2,6-toluylene diisocyanate and mixtures of these isomers ("TDI"); polyphenyl-polymethylenepolyisocyanates, as produced by aniline-formaldehyde condensation and subsequent phosgenation ("crude MDI"); and carbodiimide group-, urethane group-, allophanate group-, isocyanurate group-, urea group- or biuret group-containing polyisocyanates ("modified polyisocyanates"), particularly those modified polyisocyanates which derive from 2,4- and/or 2,6-toluylene diisocyanate or from 4,4'- and/or 2,4'-diphenylmethane diisocyanate are generally preferred.

The following are examples of suitable monofunctional isocyanates which can optionally also be used in a quantity of up to 40 mol %: alkyl isocyanates, such as methyl-, ethyl-, isopropyl-, isobutyl-, hexyl-, lauryl- and stearyl-isocyanate, chlorohexyl isocyanate, cyclohexyl isocyanate, phenyl isocyanate, tolyl isocyanate, 4-chlorophenyl isocyanate and diisopropylphenyl isocyanate.

Addition products ("Michael adducts") of acrylonitrile and hydrazine and/or aliphatic, cycloaliphatic or araliphatic di- or polyamines containing at least two primary amino groups are used as starting component (b). At least one mol of acrylonitrile and at most the number of mols of acrylonitrile corresponding to the number of amino groups contained in the diand/or poly-amines are used per mol of di- or polyamine to produce the addition products.

The following can be used as starting amines for the production of the addition products: ethylene diamine; diethylene triamine; triethylene tetramine; 1,2- and 1,3-propylene-diamine and corresponding dipropylene triamines and tripropylene tetramines; 1,4-diaminobutane; 1,6-diaminohexane; 3-methyl-1,5-diaminopentane; 1,8-diaminooctane; 2,2,4- and/or 2,4,4-trimethyl-1,6-diaminohexane; 3,3'-bis-aminopropylmethylamine; N,N'-bis-2-aminoethylpiperazine; 1-amino-3,3,5-trimethyl-5-aminomethylcyclohexane; 4,4'-diaminodicyclohexylmethane and -propane; 1,4-diaminocyclohexane; 2,4- and 2,6-hexahydrotoluylene diamine; 3,3 -dimethyl-4,4'-diaminodicyclohexylmethane; and the like. The aforementioned compounds can, of course, be used in combination.

The addition products are produced from the aforementioned amines and acrylonitrile in the given mol ratios by known processes which are, for example, described in "Organic Reactions V, Chapter 2, Cyanoethylation". The amine is conventionally introduced at a temperature of from $-20°$ to $50°$ C. and the acrylonitrile is added dropwise with cooling. As there are always amino groups in excess, the acrylonitrile is rapidly consumed. A relatively long period of stirring at relatively high temperatures is unnecessary. As the reactions progress very rapidly, continuous methods are straightforward to carry out as long as it is ensured that the substantial reaction heat can be adequately drawn off. Hydrazine and diamines can optionally be used in the form of their aqueous forms for the reaction. On completion of reaction, the water can be removed under vacuum, if required.

The addition products are generally mixtures and are preferably used as such. The addition products can optionally be purified by distillation or other processes.

As already explained, component (b) can also contain hydrazine, hydrazides and/or di- and polyamines (and up to 40 mol % of monoamines or alkanolamines) in an amount of up to 50% by weight, based on the total weight of component (b). The following can also be used as di- and polyamines in addition to those already given for the production of the "Michael adducts": N,N'-dimethyl-ethylene diamine, piperazine, 4-aminobenzylamine, 4-aminophenylethylamine, o-, m-, p-phenylene diamine, 2,4- and/or 2,6-toluylene diamine, 4,4'-diamino-diphenylmethane, optionally in admixture with relatively high aniline/formaldehyde condensates, 1,3-propylene diamines substituted at a nitrogen atom, as obtained, for example, by addition of acrylonitrile to primary monoamines and subsequent reduction, disecondary diamines, as obtained in the catalytic hydrogenation of diprimary aliphatic diamines in the presence of aldehydes and ketones.

The following are examples of monoamines: alkyl- and dialkyl amines having $C_1$–$C_{18}$ alkyl groups, cycloaliphatic amines, such as cyclohexylamine and homologs, aniline and N-alkylanilines and aniline derivatives substituted on the benzene ring. Also contemplated as "monoamines" are diamines having a tertiary and either a primary or secondary amino group, such as N,N-dimethylethylene diamine and N-methylpiperazine. Also contemplated as "monoamines" are monofunctional hydrazine derivatives and hydrazides such as N,N-dialkylhydrazines; the hydrazides of monocarboxylic acids; hydrazine monocarboxylic acid esters of monofunctional alcohols or phenols; and semicarbazides, such as methyl-, ethyl-, propyl-, butyl-, hexyl-, dodecyl-, stearyl-, phenyl- and cyclohexyl-semicarbazides.

The following are examples of useful alkanol amines: ethanol amine, diethanol amine, propanol amine, dipropanol amine, butanol amine and dibutanol amine.

The relatively high molecular weight hydroxy-group containing material contains at least one and preferably from two to eight hydroxyl groups. Suitable materials include polyethers, polythioethers, polyacetals, polyesters, polycarbonates and polyester amines having average molecular weights of from 200 to 16,000, and preferably from 500 to 12,000.

The polyethers containing at least one, preferably from two to eight, and most preferably from two to six hydroxyl groups which can be used according to the invention are those of a known type. They are produced by polymerizing epoxides, such as ethylene oxide, propylene oxide, butylene oxide, styrene oxide or epichlorohydrin on its own, for example in the presence of Lewis catalysts, such as $BF_3$, or by adding these epoxides (preferably ethylene oxide and propylene oxide) optionally in admixture or in succession, to starting components having reactive hydrogen atoms, such as water, alcohols, ammonia or amines, such as ethylene glycol, propylene-(1,3) or (1,2) glycol, trimethylol propane, glycerin sorbitol, 4,4'-dihydroxydiphenylpropane, aniline, ethanolamine and ethylene diamine. Sucrose polyethers as described, for example, in German Offenlegungsschriften Nos. 1,176,358 and 1,064,938, and polyethers which are started on formitol or formose (German Offenlegungsschriften Nos. 2,639,083 or 2,737,951) can also be used according to the invention. In many cases, those polyethers are preferred which contain (up to 90% by weight based on all the OH groups present in the polyether) substantial amounts of primary OH groups. OH-group-containing polybutadienes are also suitable according to the invention, as are hydroxy functional polymers of tetrahydrofuran.

The polythioethers include in particular the condensation products of thiodiglycol on its own and/or with other glycols, dicarboxylic acids, formaldehyde, aminocarboxylic acids or amino alcohols. Depending on the co-components, the products are, for example, polythio-mixed ethers, polythioether esters or polythioether ester amides.

The compounds which may be produced from glycols, such as diethylene glycol, triethyleneglycol, 4,4'-bishydroxy-ethoxy diphenyl dimethylmethane and hexane diol, and formaldehyde, for example, can be used as polyacetals. The polymerization of cyclic acetals, such as trioxane (German Offenlegungsschrift No. 1,694,128) also yields polyacetals which are suitable according to the invention.

The hydroxyl group-containing polyesters which can be used include, for example, reaction products of polyhydric (preferably dihydric, and optionally trihydric) alcohols and polybasic (preferably dibasic) carboxylic acids. The corresponding polycarboxylic acid anhydrides or corresponding polycarboxylic acid esters of alcohols or the mixtures thereof can also be used instead of the free polycarboxylic acids for the production of the polyesters. The polycarboxylic acids can be of an aliphatic, cycloaliphatic, aromatic and/or heterocyclic nature and can be substituted by halogen atoms and/or be unsaturated. The following are examples of suitable carboxylic acids and derivatives thereof: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylene tetrahydrophthalic acid anhydride; glutaric acid anhydride; maleic acid; maleic acid anhydride: fumaric acid; dimerized and trimerized unsaturated fatty acids, optionally in admixture with monomeric unsaturated fatty acids, such as oleic acid; terephthalic acid dimethyl esters; terephthalic acid-bis-glycol-esters; and the like. The following are examples of suitable alcohols: ethylene glycol; propylene-(1,2) and -(1,3)-glycol; butylene-(1,4) and -(2,3)-glycol; hexane-(1,6)-diol; octane-(1,8)-diol; neopentyl glycol; 1,4-bis-hydroxymethylcyclohexane; 2-methyl-1,3-propane diol; glycerin; trimethylolpropane; hexane-(1,2,6)-triol; butane-(1,2,4)-triol; trimethylolethane; pentaerythritol; quinitol; mannitol; sorbitol; formitol; methylglycoside; diethylene glycol; triethylene glycol; tetraethylene glycol and higher polyethylene glycols; dipropylene glycol and higher polypropylene glycols; dibutylene glycol and higher polybutylene glycols; and the like. The polyesters can contain low amounts of terminal carboxyl groups. Polyesters based on lactones, such as ε-caprolactone, or on hydroxycarboxylic acids, such as ω-hydroxycaproic acid can also be used.

Those hydroxyl group-containing polycarbonates which can be produced, for example, by reacting diols, (such as propane-(1,3)-diol, butane-(1,4)-diol and/or hexane-(1,6)-diol, diethylene glycol, triethylene glycol, tetraethylene glycol or thiodiglycol) with diaryl carbonates, such as diphenyl carbonate, or phosgene (German Auslegeschriften Nos. 1,694,080, 1,915,908 and 2,221,751; German Offenlegungsschrift No. 2,605,024) can be used as hydroxyl group-containing polycarbonates.

Urethane- or urea-group-containing polyhydroxyl compounds and optionally modified natural polyols, such as castor oil can also be used. Addition products of alkylene oxides and phenol-formaldehyde resins or urea-formaldehyde resins can also be used according to the invention. Polyethers are the preferred hydroxy-containing material.

The isocyanates can be reacted with the amine-functional material in the hydroxy-containing material according to discontinuous and continuous processes. Thus, for example, the hydroxy-containing material can be introduced together with the amine functional material at a temperature of from 20° to 100° C. and the isocyanate can be added dropwise. The reaction heat is optionally drawn off by external cooling. It is also possible to introduce only the hydroxy material at a temperature of from 20° to 120° C. and to meter in the amine functional component and the isocyanate simultaneously.

A continuous production method as described in German Pat. No. 2,513,815 is preferred. In such a process, the isocyanate is continuously reacted with the amine in the relatively high molecular weight hydroxy material in a flow mixing apparatus. The product emerging from the flow mixing apparatus is subsequently reacted for a further 1 to 2 hours at a temperature of from 50° to 150° C. in a receiver and is optionally dehydrated under vacuum.

Component (a) can be reacted with component (b) in component (c) according to the invention in the presence of additives, such as water, relatively low molecular weight hydroxyl compounds having a molecular weight of from 32 to 199 (such as alcohols or glycols), catalysts, flameproofing agents, emulsifiers, dye pastes, stabilizers and the like. (Component (d)).

The possibility of carrying out the reaction in the presence of from 1 to 20% by weight of water, based on the total mixture, is particularly important for the following reasons: (1) inexpensive amines, which are commercially available in aqueous form can be used; (2) the water acts, particularly in the continuous method, as an internal cooling agent due to the high heat capacity thereof, this being particularly important in the production of dispersions containing large quantities of filler (high turnover/volumetric unit); (3) water (the same holds true for alcohols and glycols) reacts with the isocyanates in competition with the hydroxy-containing material and thereby facilitates the control of the incorporation of the hydroxyl-containing material into the solids particles. Minimum incorporation is required so that the dispersions are stable to sedimentation. An increased incorporation produces undesirable rises in viscosity.

The addition of catalysts, particularly tin organic compounds which promote the hydroxy/isocyanate reaction, counteracts the effect of water. This can be useful if the reactions are carried out at a low equivalent ratio and/or in polyols having substantially secondary hydroxyl groups. The dispersions of the invention are valuable starting materials for a variety of polyurethane products. The dispersions according to the invention may, for example, be processed to produce flexible, semi-rigid and rigid polyurethane foams with improved properties, such as improved tensile strength and hardness. The dispersions are also suitable for the production of elastomers and coatings. For this purpose, the dispersions according to the invention are reacted (optionally in the presence of other conventional polyols) with aliphatic, cycloaliphatic, araliphatic, aromatic and heterocyclic polyisocyanates, of the type noted above, optionally in the presence of auxiliaries and additives. Such auxiliaries and additives include blowing agents, catalysts, surface active additives, reaction retarders, and the like.

Water and/or readily volatile inorganic or organic substances can be used as blowing agents. Organic blowing agents include: acetone, ethyl acetate, halogen-substituted alkanes, such as methylene chloride, chloroform, ethylidene chloride, monofluorotrichloromethane, chlorodifluoromethane, and dichlorodifluoromethane. Air, $CO_2$ or $N_2O$ can be used as inorganic blowing agents. Further examples of blowing agents and details about the use of blowing agents are given in the Kunststoff-Handbuch, Vol. VII, published by Vieweg and Höchtlen, Carl-Hanser Verlag, Munich 1966, for example, on pages 108 and 109, 453-455 and 507-510.

Various catalysts of known type can also be used, including: tertiary amines, such as triethylamine; tributylamine; N-methyl-morpholine; N-ethylmorpholine; N,N,N',N'-tetramethyl-ethylenediamine; pentamethyl-diethylenetriamine and higher homologs (German Offenlegungsschriften Nos. 2,624,527 and 2,624,528); 1,4-diazabicyclo-(2,2,2)-octane; N-methyl-N'-dimethylaminoethylpiperazine; bis-(dimethylaminoalkyl)-piperazines (German Offenlegungsschrift No. 2,636,787); N,N-dimethyl-benzylamine; N,N-dimethyl-cyclohexylamine; N,N-diethylbenzylamine; bis-(N,N-dimethylaminoethyl)adipate; N,N,N',N'-tetramethyl-1,3-butane diamine; N,N-dimethyl-β-phenylethylamine; 1,2-dimethylimidazole; 2-methylimidazole; monocyclic and bicyclic amidines (German Offenlegungsschrift No. 1,720,633); bis-(dialkylamino)-alkylethers (U.S. Pat. No. 3,330,782, German Pat. No. 1,030,558 and German Offenlegungsschriften Nos. 1,804,361 and 2,618,280); and amide group- (preferably formamide group-) containing tertiary amines as described in German Offenlegungsschriften Nos. 2,523,633 and 2,732,292. Known Mannich bases of secondary amines, such as dimethylamine, and aldehydes (preferably formaldehyde), or ketones (such as acetone, methylethylketone or cyclohexanone) and phenols (such as phenol, nonylphenol or bisphenol) can also be used as catalysts. Examples of isocyanate group-active hydrogen atom-containing tertiary amines which can be used as catalysts include triethanolamine; triisopropanolamine; N-methyldiethanolamine; N-ethyldiethanolamine; N,N-dimethylethanolamine; the reaction products thereof with alkylene oxides (such as propylene oxide and/or ethylene oxide) and secondary-tertiary amines as described in German Offenlegungsschrift No. 2,732,292.

Sila-amines having carbon-silicon bonds, as described, for example, in German Pat. No. 1,229,290 (corresponding to U.S. Pat. No. 3,620,984) can also be used as catalysts. Specific examples include 2,2,4-trimethyl-2-silamorpholine and 1,3-diethylaminomethyltetramethyl-disiloxane.

Nitrogen-containing bases (such as tetraalkylammonium hydroxides), alkali metal hydroxides (such as sodium hydroxide), alkali metal phenolates (such as sodium phenolate) or alkali metal alcoholates, such as sodium methylate can also be used as catalysts. Hexahydrotriazines can also be used as catalysts (German Offenlegungsschrift No. 1,769,043).

The reaction of the NCO-groups and the active hydrogen atoms to produce polyurethane(urea) compositions is also substantially accelerated by lactams and azalactams, an associate first forming between the lactam and the compound having acidic hydrogen. Such associates and the catalytic effect thereof are described in German Offenlegungsschriften Nos. 2,062,288, 2,062,289, 2,117,576 (U.S. Pat. No. 3,758,444), 2,129,198, 2,330,175 and 2,330,211.

Organic metal compounds, particularly organic tin compounds, can also be used to produce polyurethane products. Tin(II)salts of carboxylic acids, such as tin-(II)-acetate, tin(II)-octoate, tin(II)-ethylhexoate and tin(II)-laurate and the tin(IV)-compounds, such as dibutyltin oxide, dibutyltin dichloride, dibutyltin diacetate, dibutyltin dilaurate, dibutyltin maleate or dioctyltin diacetate are preferably used as organic tin compounds in addition to sulphur-containing compounds, such as di-n-octyl-tin-mercaptide (German Auslegeschrift No. 1,769,367; U.S. Pat. No. 3,645,927).

All the aforementioned catalysts can, of course, also be used as mixtures. Combinations of organic metal compounds and amidines, aminopyridines or hydrazinopyridines (German Offenlegungsschriften Nos. 2,434,185, 2,601,082 and 2,603,834) are of particular interest.

Further examples of catalysts which can be used and details about the effect of the catalysts are given in the Kunststoff-Handbuch, Vol II, published by Vieweg and Höchtlen, Carl-Hanser-Verlag, Munich 1966, e.g., on pages 96 to 102.

The catalysts are generally used in a quantity of from about 0.001 to 10% by weight, based on the total quantity of compounds having isocyanate-reactive hydrogen atoms.

Surface-active additives, such as emulsifiers and foaming stabilizers can also be used. The sodium salts of castor oil sulphonates or salts of fatty acids with amines, such as oleic acid diethylamine or stearic acid diethanolamine, for example, can be used as emulsifiers. Alkali metal or ammonium salts of sulphonic acids, such as of dodecyl benzene sulphonic acid or dinaphthyl methane disulphonic acid or of fatty acids, such as ricinoleic acid or of polymeric fatty acids can also be used as surface-active additives.

Polyether siloxanes, particularly water-soluble examples thereof are used in particular as foam stabilizers. These compounds are generally structured in such a manner that a copolymer of ethylene oxide and propylene oxide is bound to a polydimethyl siloxane radical. Such foaming stabilizers are described, for example, in U.S. Pat. Nos. 2,834,748, 2,917,480 and 3,629,308. Polysiloxane-polyoxyalkylene-copolymers which are branched via allophanate groups as described in German Offenlegungsschrift No. 2,558,523 are in many cases of particular interest.

Reaction retarders, for example acidically-reacting materials (such as hydrochloric acid or organic acid halides), cell regulators of known type (such as paraffins or fatty alcohols or dimethylpolysiloxanes), and pigments or dyes and flameproofing agents of known type (such as tris-chloroethylphosphate, tricresylphosphate or ammonium-phosphate and -polyphosphate), stabilizers against the effect of aging and weathering, plasticizers and fungistatically- and bacteriostatically-acting materials, and fillers (such as barium sulphate, kieselguhr, carbon black or prepared chalk) can also be used.

Further examples of surface-active additives and foaming stabilizers and cell regulators, reaction retarders, stabilizers, flame-retarding materials, plasticizers, dyes and fillers and fungistatically- and bacteriostatically-active materials which are optionally also used according to the invention and details about the use and effect of these additives are given in the Kunststoff-Handbuch, Vol. VII, published by Vieweg and Höchtlen, Carl-Hanser-Verlag, Munich 1966, for example on pages 103 to 113.

The reaction constituents to produce a polyurethane(urea) product are reacted according to the invention by known one-stage processes, the prepolymer process or the semi-prepolymer process. Mechanical apparatus, for example, those described in U.S. Pat. No. 2,764,565 are often used. Details about processing apparatus which can also be used according to the invention are described in the Kunststoff-Handbuch, Vol. VII, published by Vieweg and Höchtlen, Carl-Hanser-Verlag, Munich 1966, for example on pages 121 to 205.

In the production of foam, foaming can also be carried out according to the invention in closed molds. The reaction mixture is introduced into a mold. Metal, such as aluminum, or plastics material, such as epoxide resin, can be used as material for the mold. The foamable reaction mixture foams in the mold and forms the molding. Mold foaming can be carried out such that the molding has a cellular structure on its surface, but can also be carried out in such a manner that the molding has a compact sheath and a cellular core. A process can also be carried out such that a sufficient quantity of reaction mixture is introduced into the mold so that the foam which forms exactly fills out the mold. The process can, however, also be carried out such that more foamable reaction mixture is introduced into the mold than is necessary to fill the mold cavity with foam. "Overcharging" is the method used in the latter case. Such a method is known, for example, from U.S. Pat. Nos. 3,178,490 and 3,182,104.

Known "external mold release agents" such as silicone oils, can also be used in many cases in mold foaming. However, so-called "internal mold release agents" can also be used, optionally in admixture with external mold release agents, as are known, for example, from German Offenlegungsschriften Nos. 2,121,670 and 2,307,589.

Cold-hardening foams can also be produced according to the invention (see, e.g., British Pat. No. 1,162,617 and German Offenlegungsschrift No. 2,153,086).

Foams can, of course, also be produced by block foaming or by the known laminator process.

The polyurethane plastics produced by the process according to the invention are, for example, used as padding materials, mattresses, packing materials, impact-absorbing automobile parts, films for coating and insulation materials. The highly-flexible foams produced by the process according to the invention are particularly suitable for flame-covering with films, woven and worked fabrics of natural and synthetic materials. Films of these foams can also be welded using high frequency and ultrasonics. The rigid polyurethane foams which are produced are particularly suitable for the production of articles having an integral structure or of sandwich elements.

The foams can thus either be produced by the mold foaming process or by ancillary processing from block foamed materials. They may be further processed by deep-drawing, stamping or heat shaping.

The process according to the invention is described in more detail with reference to the following examples. Unless otherwise indicated, all figures are to be understood as % by weight or parts by weight.

The abbreviations used in the examples for the polyethers are defined as follows:

Polyether A: A polyether started on glycerin, consisting of propylene oxide and ethylene oxide having an OH number of 34 and containing about 80% by weight of primary OH groups.

Polyether B: A polyether started on trimethylolpropane, consisting of propylene oxide and ethylene oxide having an OH number of 45 and substantially containing secondary OH groups (less than 5% b.w. of primary OH groups).

Polyether C: A polyether started on glycerin, consisting of propylene oxide and ethylene oxide having an OH number of 56 and containing about 50% by weight of primary OH groups.

Polyether D: As polyether A, except that it has an OH number of 28 and contains about 80% by weight of primary OH groups.

Polyether E: Linear polypropylene glycol (OH number 56) containing secondary OH groups.

Polyether F: Linear polypropylene glycol, terminally modified with ethylene oxide (OH number 28; containing about 80% by weight of primary OH groups).

Polyether G: Polyethylene oxide started on trimethylol propane (OH number 550).

Polyether H: A polyether started on trimethylol propane, consisting of propylene oxide and ethylene oxide having an OH number of 35 and containing about 70% by weight of primary OH groups.

Polyether J: A polyether started on glycerin, consisting of propylene oxide and ethylene oxide having an OH number of 46 and substantially containing secondary OH groups (less than 5% b.w. of primary OH groups).

Polyether K: A polyether started on trimethylol propane, consisting of propylene oxide and ethylene oxide having an OH number of 28 and containing about 90% by weight of primary OH groups.

The following abbreviations are used for the polyisocyanates used in the examples:

TDI 80: a mixture of 80% by weight of 2,4-and 20% by weight of 2,6-toluylene diisocyanate TDI 100: 2,4-toluylene diisocyanate TDI 65: a mixture of 65% by weight of 2,4-and 35% by weight of 2,6-toluylene diisocyanate Polyisocyanate I: 4,4'-diphenylmethane diisocyanate (about 60% b.w. based on the total mixture) having polymeric proportions: $\eta 25° \sim 100$ mPas; NCO-content: 31.5% b.w.

Polyisocyanate II: 4,4'-diphenylmethane diisocyanate (about 50% b.w. based on the total mixture) having polymeric proportions $\eta 25° \sim 200$ mPas; NCO-content: 31.5% b.w.

Other abbreviations used:

TCA: tris-(2-chloroethyl)-phosphate

DBTL: dibutyltin dilaurate

KZ: equivalent ratio of isocyanate to amine

The following "Michael-adducts" consisting of amines or hydrazine and acrylonitrile are used in the examples:

Adduct a: hydrazine hydrate, acrylonitrile, mol ratio 1:1 b: ethylene diamine 80% by weight aqueous solution, acrylonitrile, mol ratio 1:2 c: as b, mol ratio 2:3 d: hexamethylene diamine, acrylonitrile, mol ratio 1:1 e: as d, mol ratio 1:2 f: bis-(2-aminoethyl)-amine, acrylonitrile, mol ratio 1:2

The amines are introduced at a temperature of 20° C. and the acrylonitrile is added dropwise with stirring and ice cooling to produce the addition compounds. The reactions are completed by 2- to 3-hour stirring (controlled by acrylonitrile-tracing apparatus).

EXAMPLES

Example 1

8163 g of polyether A are introduced together with 366 g of adduct a at a temperature of 80° C. with rapid stirring and 609 g of TDI 80 is added dropwise over the course of 1 hour. After a further hour, no further NCO bands are observed in the IR spectrum. Dehydration is now carried out at a temperature of 100° C. and under 1 mbar. A 10% finely-divided sedimentation-stable dispersion is obtained which has a viscosity of 7500 mPas at 25° C.

Example 2

1500 g of polyether A are introduced at 100° C. with rapid stirring. 88.4 g of TDI 80 and 78.3 g of adduct f are synchronously added dropwise from two separate dropping funnels over a period of 20 min. A finely-divided dispersion is obtained after a further 30 min at 100° C. which has a viscosity of 3030 mPas at 25° C.

Example 3

2250 g/min of polyether A and 1185 g/min of adduct b, the original water content of which has been increased from 8.3% before to 17.6%, are continuously pumped from two separate storage containers into a static mixing apparatus. 750 g/min of polyether A and 1024 g/min of TDI 80 are simultaneously separately supplied to a second static mixing apparatus. The two partial streams pass separately into the mixing zone of a toothed stirring device (chamber volume 0.5 liter; speed 5000 rpm), in which polyaddition takes place with an exothermic reaction. The dispersion leaving the toothed stirring device at a temperature of 130° C. is collected in a residence time vessel where it is maintained with rapid stirring at a temperature of from 80° to 100° C. for about 2 hours. The resulting water is distilled off under vacuum even during this subsequent stirring time. A stable white 40% dispersion is obtained which has a viscosity of 4060 mPas/25° C.

Examples 4 to 24

The following products are produced analogously to Example 3. If the water is also used, it is added to the amine. The percentages for additives are % by weight and relate to the total mixture. More detailed data are given in Table 1.

TABLE 1

| Example | Poly-ether | Isocyanate | Amine | Equiv. ratio | % Solids | % H$_2$O | % TCA | ppm DBTL | $\eta 25°$ (mPas) |
| --- | --- | --- | --- | --- | --- | --- | --- | --- | --- |
| 4 | A | TDI 80 | b | 100 | 30 | 4 | — | — | 2515 |
| 5 | A | polyiso-cyanate I | b | 105 | 15 | 0.5 | — | 100 | 2420 |
| 6 | A | polyiso-cyanate II | b | 125 | 15 | 2 | — | 100 | 3660 |
| 7 | A | polyiso-cyanate I | c | 105 | 15 | 0.5 | 2 | 100 | 3125 |
| 8 | A | polyiso-cyanate II | c | 105 | 15 | 1 | — | — | 2580 |
| 9 | A | polyiso-cyanate I | b | 100 | 20 | 0.5 | — | — | 3480 |
| 10 | A | polyiso-cyanate I | b | 105 | 20 | 0.5 | — | — | 4250 |
| 11 | A | TDI 80 | b | 105 | 20 | 0.5 | — | — | 4290 |
| 12 | A | TDI 80 | b | 110 | 20 | 0.5 | — | — | 6580 |
| 13 | A | TDI 80 | c | 105 | 20 | 0.5 | — | — | 3300 |
| 14 | A | TDI 80 | c | 110 | 20 | 0.5 | — | — | 4800 |
| 15 | B | TDI 80 | e | 120 | 20 | 10 | — | — | 1450 |
| 16 | B | TDI 80 | d | 100 | 20 | — | — | — | 2090 |
| 17 | B | TDI 80 | d | 100 | 20 | — | — | 500 | 1900 |
| 18 | B | TDI 80 | c | 110 | 40 | 6 | 2 | 100 | 2550 |
| 19 | B | TDI 80 | c | 100 | 50 | 6 | 2 | 100 | 5850 |
| 20 | B | TDI 80 | c | 110 | 50 | 8 | 2 | 100 | 5600 |
| 21 | C | TDI 65 | b | 110 | 20 | 0.5 | — | 100 | 2030 |
| 22 | D | TDI 100 | b | 105 | 15 | 0.5 | — | 100 | 3120 |
| 23 | E | TDI 65 | c | 115 | 20 | 0.5 | — | 100 | 2950 |
| 24 | F | TDI 80 | c | 110 | 20 | 0.5 | — | 100 | 2800 |

Examples 25 to 28 (Use Examples)

Table 2 shows the production according to the invention of good load bearing polyurethane block foams. The foam mixtures are produced on a UBT apparatus (commercial mixing apparatus) with a polyol discharge of 30 kg/min. The components are metered in four separate streams: polyol or polyol mixture, activator mixture (water, amine activator, stabilizer), isocyanate and tin catalyst.

TABLE 2

| Examples | 25 | 26 | 27 | 28 |
| --- | --- | --- | --- | --- |
| Polyol dispersion according to Example 18 (40% filler) | 100 | 100 | 50 | 50 |
| Polyether J | — | — | 50 | 50 |
| H$_2$O | 4.0 | 2.0 | 4.0 | 2.0 |
| Stabilizer (Tegostab ® B 8002, Goldschmidt AG) | 1.0 | 0.6 | 1.0 | 0.8 |
| Amine activator I (Desmorapid ® PS 207, Bayer AG) | 0.1 | 0.2 | 0.15 | 0.2 |
| Amine activator II (dimethyl-ethanolamine) | 0.1 | 0.3 | 0.15 | 0.3 |
| Tin-dictoate | 0.15 | 0.12 | 0.18 | 0.15 |
| TDI 80 | 46.2 | 25.4 | 47.9 | 26.9 |
| Apparent density kg/m$^3$ | 27 | 53 | 26 | 49 |
| Tensile strength Kpa | 190 | 255 | 150 | 210 |
| Elongation at break % | 100 | 135 | 145 | 210 |
| Compression hardness at 40% shaping Kpa | 8.6 | 12.3 | 5.4 | 7.5 |

Examples 29 to 32 (Use Examples)

Table 3 shows the production of highly-flexible, shrink-free and easily mechanically impressible foams from the dispersions according to the invention. The foam mixtures are produced as "hand foam", the components given in Table 3, with the exception of the isocyanate, being weighed in a cardboard beaker in succession and being thoroughly mixed using a high-speed mixing apparatus. The isocyanate component is introduced into this mixture, mixed intensively for 10 sec and the mixture is introduced into an open paper mold.

Example 32 is a comparative Example showing the production of a flexible foam from a polyether dispersion according to German Pat. No. 2,513,815 (20% dispersion of the polyaddition product consisting of TDI 80 and hydrazine hydrate in polyether A). As can be seen from the Table, the same quality of properties is achieved with the dispersion according to Example 6 of the invention which only contains 15% solids material, as the 20% dispersion according to German Pat. No. 2,513,815.

TABLE 3

| Examples | 29 | 30 | 31 | 32 |
|---|---|---|---|---|
| Polydispersion according to Example 6 | 100 | 44 | 33 | |
| Polydispersion according to German Patent 2,513,815 | | | | 100 |
| Polyether H | — | 56 | 67 | — |
| Water | 3.0 | 3.0 | 3.5 | 3.0 |
| Diethanolamine | 1.2 | 1.2 | 1.5 | 1.2 |
| Stabilizer (KS 53, Bayer AG, Germany) | 0.5 | 0.5 | 0.8 | 0.5 |
| Amine activator I (Dabco ® 33LV, Air Products) | 0.2 | 0.2 | 0.2 | 0.2 |
| Amine activator II (catalyst A1 (UCC)) | — | 0.05 | 0.05 | — |
| Trichloroethyl phosphate | 2.0 | 2.0 | 2.0 | 2.0 |
| Tin-dioctoate | 0.18 | 0.11 | 0.17 | 0.18 |
| Trichloromonofluoromethane | — | — | 15 | — |
| Toluylene diisocyanate (TDI 80) | 39.7 | 40.0 | 46.2 | 39.7 |
| Apparent density kg/m$^3$ | 33 | 33 | 20 | 33 |
| Tensile strength kPa | 130 | 115 | 100 | 125 |
| Elongation at break % | 120 | 125 | 175 | 120 |
| Compression hardness at 40% shaping kPa | 5.0 | 3.8 | 1.6 | 4.3 |
| Recovery % | 80 | 82 | 80 | 78 |
| SAG-factor | 2.6 | 2.6 | 2.7 | 2.5 |

Examples 33 to 35 (Use Examples)

Table 4 shows the production of load-bearing molded flexible foams from the dispersions according to the invention. The foam mixtures are produced as "hand foam", the components given in Table 4, with the exception of the isocyanate, being weighed in a cardboard beaker in succession and being thoroughly mixed using a high-speed mixing apparatus. The isocyanate component is introduced into this mixture, mixed intensively for 10 sec. and the mixture is introduced into an open mold, which is closed immediately.

TABLE 4
Example 33-35 (Use Examples)
Table 4 shows the production according to the invention of flexible load-bearing foam moldings (foaming in closed molds according to prior art).

| Examples | 33 | 34 | 35 |
|---|---|---|---|
| Polyether D | 50 | 50 | 50 |
| Polyether dispersion according to | | | |
| Example 7 | 50 | — | — |
| Example 10 | — | 50 | — |
| Example 12 | — | — | 50 |
| H$_2$O | 3.2 | 3.2 | 3.2 |
| Amine catalyst (catalyst A 1 (UCC)) | 0.1 | 0.1 | 0.1 |
| Amine catalyst (Dabco ® 33 LV (Air Products)) | 0.5 | 0.5 | 0.5 |
| Siloxane stabilizer (KS 43 (Bayer AG)) | 1.0 | 1.0 | 1.0 |
| TDI/MDI 80/20 mixture (characteristic number) | 105 | 105 | 105 |

TABLE 4-continued
Example 33-35 (Use Examples)
Table 4 shows the production according to the invention of flexible load-bearing foam moldings (foaming in closed molds according to prior art).

| Examples | 33 | 34 | 35 |
|---|---|---|---|
| Apparent density (kg/m$^3$) | 39 | 38 | 38 |
| Tensile strength (kPa) | 120 | 130 | 125 |
| Elongation at break (%) | 145 | 150 | 145 |
| Compression hardness (50) (kPa) | 5.0 | 4.1 | 4.1 |

Examples 36 to 38 (Use Examples)

Production of massive PU moldings by the RIM process.

Example 36

77 parts by weight of the polyol dispersion according to Example 4;
0.2 parts by weight of dibutyl tin dilaurate;
0.2 parts by weight of amine catalyst (Dabco ®33 LV (Air Products)); and
23 parts by weight of an aromatic diamine, produced by alkylating a commercial mixture of 2,4- and 2,6-diamino-1-methyl-benzene;
are thoroughly mixed. 100 parts by weight of this polyol mixture are filled into a plate mold by the known RIM process after high pressure mixing with 60 parts by weight of an NCO group-containing reaction product of 4,4'-diphenylmethane-diisocyanate with a deficient quantity of an equimolar mixture of di- and tripropylene glycol (NCO content: 23% by weight).

Example 37

A polyol dispersion according to Example 3 is used instead of polyol dispersion according to Example 4.

Example 38 (Comparative Example)

The polyether K is used instead of a polyol dispersion.

The mechanical characteristics of the Examples according to the invention and the Comparative Example are given in Table 5, as is the number of the possible removals from the mold after a single separation.

TABLE 5

| Examples | 36 | 37 | 38 |
|---|---|---|---|
| Density kg/m$^3$ DIN 53 420 | 1100 | 1100 | 1100 |
| Tensile strength mPa DIN 53 504 | 40 | 42 | 28 |
| Elongation at break DIN 53 504 | 150 | 120 | 300 |
| Shore-D-hardness DIN 53 505 | 70 | 73 | 57 |
| Number of removals from mold | 10 | 10 | 5 |

It can be seen that there is a marked increase in hardness and twice as many moldings can be removed from the mold by using the dispersions according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A stable dispersion of a polyurea and/or a polyhydrazodicarbonamide in a relatively high molecular weight hydroxyl-group containing material, which dispersion has a solids content of from 5 to 50 percent by weight and which is obtained by reacting
(a) an organic di- and/or polyisocyanate with
(b) an amine-functional material comprising an addition product of
  (1) acrylonitrile and
  (2) a member selected from the group consisting of
    (i) hydrazine,
    (ii) aliphatic di- or polyamines containing at least two primary amino groups,
    (iii) cycloaliphatic di- or polyamines containing at least two primary amino groups,
    (iv) araliphatic di- or polyamines containing at least two primary amino groups, and
    (v) mixtures thereof,
  the ratio of (1) to (2) being at least one mol of (1) per mol of (2) and at most one mol of (1) for each nitrogen atom contained in (2) per mol of (2),
the reaction of component (a) and component (b) being conducted at a temperature of from 30° to 170° C., at an equivalent ratio of components (a) to (b) of from 0.8:1 to 1.5:1, and in the presence of
(c) a relatively high molecular weight, hydroxyl-group containing material.

2. The dispersion of claim 1 wherein component (a) contains up to 40 mol % of one or more monoisocyanates.

3. The dispersion of claim 1 wherein component (b) comprises said addition product and up to 50% by weight of (i) a primary and/or secondary amino-group containing di- or polyamine, and/or (ii) hydrazines and/or (iii) hydrazides.

4. The dispersion of claim 3, wherein said component (b) contains up to 40 mol % of a monoamine or an alkanolamine.

5. The dispersion of claim 1 wherein the reaction of components (a) and (b) is conducted in the presence of component (c) and in the presence of (d) water, relatively low molecular weight hydroxyl-group containing compounds, catalysts and/or flameproofing agents.

6. The dispersion of claim 1, wherein component (c) comprises a relatively high molecular weight polyether polyol, at least 95% of the OH-groups of which are secondary, and wherein said dispersion has a solids content of from 5 to 30% by weight at an equivalent ratio of components (a) to (b) of from 0.8 to 1.5 and a solids content of from 30 to 50% by weight at an equivalent ratio of from 0.8 to 1.3.

7. The dispersion of claim 1, wherein component (c) comprises a relatively high molecular weight polyether polyol, at least 20% of the OH-groups of which are primary, and wherein said dispersion has a solids content of from 5 to 15% by weight at an equivalent ratio of components (a) to (b) of from 0.8 to 1.3 and a solids content of from 15 to 40% by weight at an equivalent ratio of from 0.8 to 1.1.

8. A process for preparing a stable dispersion of a polyurea and/or a polyhydrazodicarbonamide in a relatively high molecular weight hydroxyl-group containing material, which dispersion has a solids content of from 5 to 50 percent by weight, said process comprising reacting
(a) an organic di- and/or polyisocyanate with
(b) an amine-functional material comprising an addition product of
  (1) acrylonitrile and
  (2) a member selected from the group consisting of
    (i) hydrazine,
    (ii) aliphatic di- or polyamines containing at least two primary amino groups,
    (iii) cycloaliphatic di- or polyamines containing at least two primary amino groups,
    (iv) araliphatic di- or polyamines containing at least two primary amino groups, and
    (v) mixtures thereof,
  the ratio of (1) to (2) being at least one mol of (1) per mol of (2) and at most one mol of (1) for each nitrogen atom contained in (2) per mol of (2),
the reaction of component (a) and component (b) being conducted at a temperature of from 30° to 170° C., at an equivalent ratio of components (a) to (b) of from 0.8:1 to 1.5:1, and in the presence of
(c) a relatively high molecular weight, hydroxyl-group containing material.

9. The process of claim 8 wherein component (a) contains up to 40 mol % of one or more monoisocyanates.

10. The process of claim 8 wherein component (b) comprises said addition product and up to 50% by weight of (i) a primary and/or secondary amino-group containing di- or polyamine, and/or (ii) hydrazines and/or (iii) hydrazides.

11. The process of claim 10, wherein said component (b) contains up to 40 mol % of a monoamine or an alkanolamine.

12. The process of claim 8 wherein the reaction of components (a) and (b) is conducted in the presence of component (c) and in the presence of (d) water, relatively low molecular weight hydroxyl-group containing compounds, catalysts and/or flameproofing agents.

* * * * *